G. MARSHALL.
MACHINE FOR MAKING SHOCKS.
APPLICATION FILED APR. 3, 1911.
1,000,533.
Patented Aug. 15, 1911.
3 SHEETS—SHEET 3.
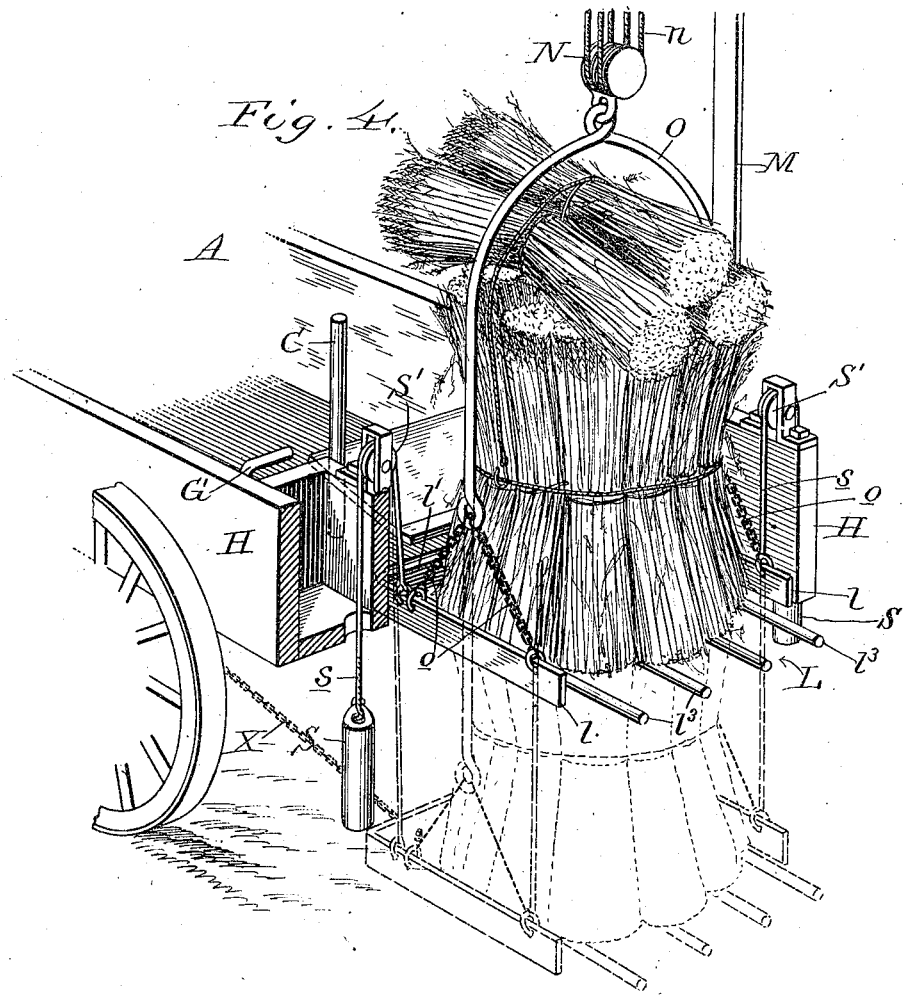
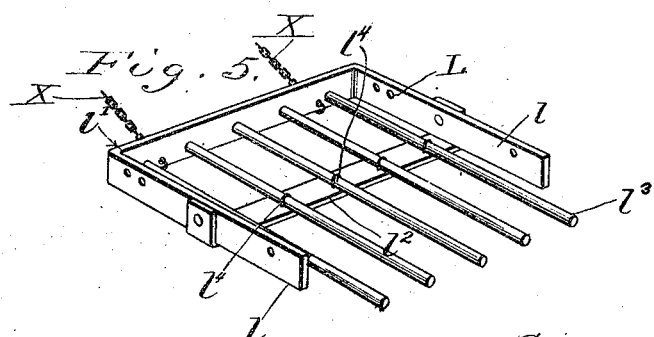
Witnesses
Inventor
George Marshall.

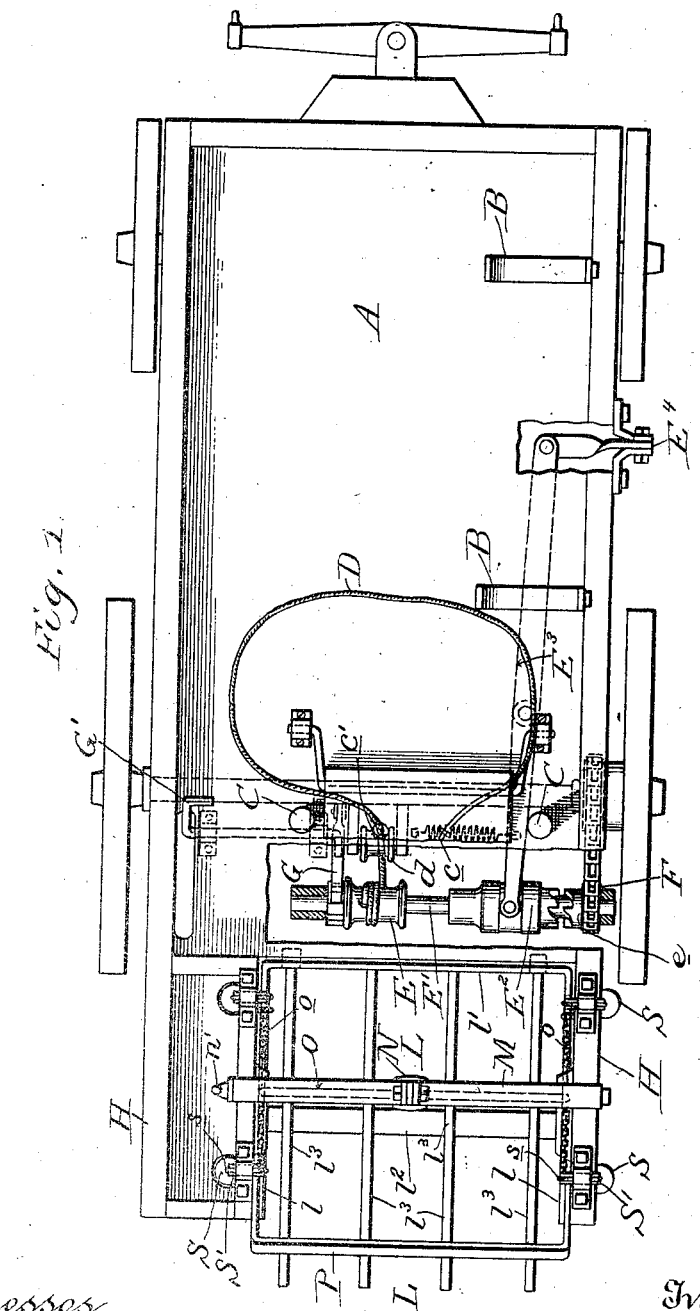

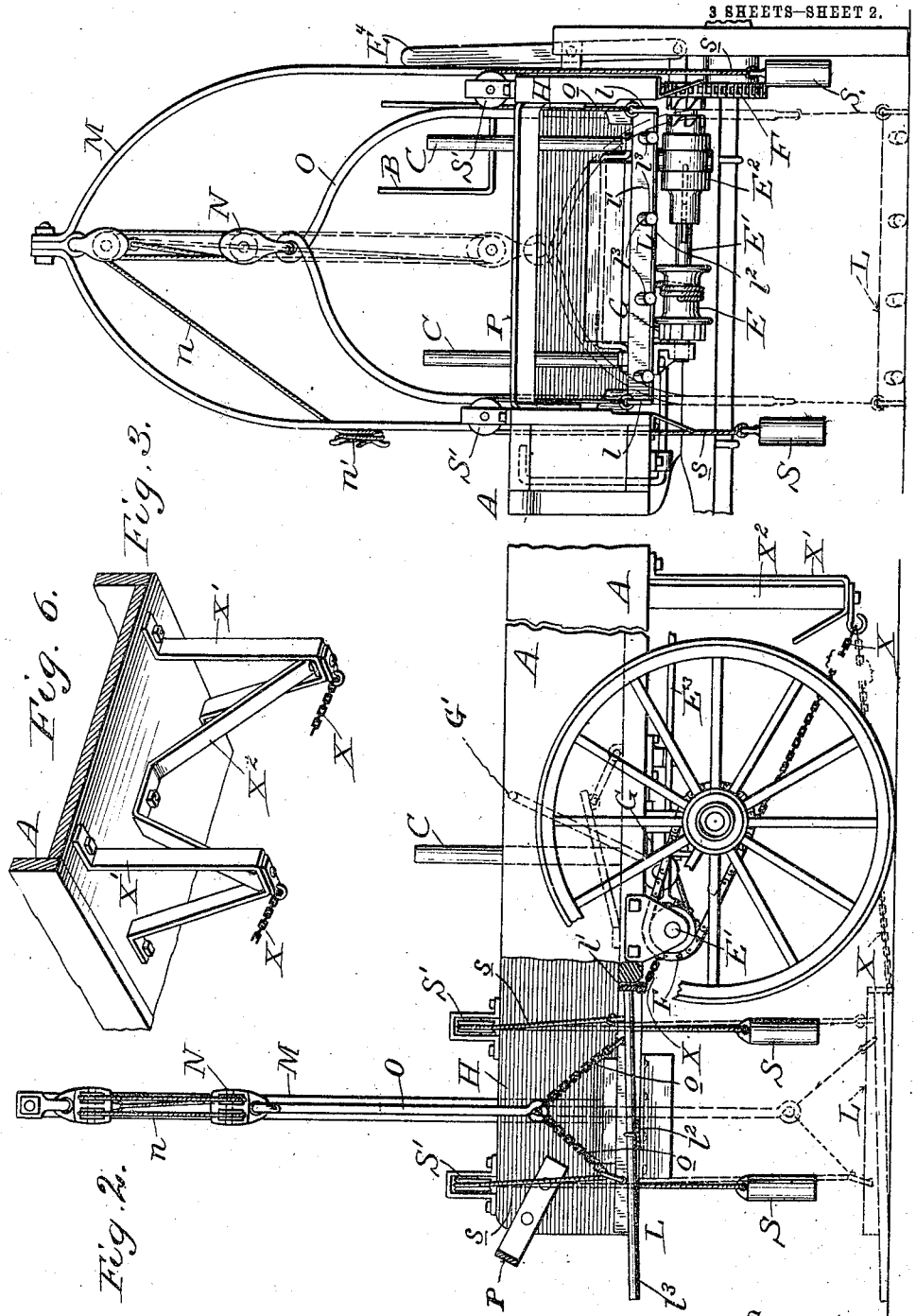

UNITED STATES PATENT OFFICE.

GEORGE MARSHALL, OF FREMONT, NEBRASKA.

MACHINE FOR MAKING SHOCKS.

1,000,533.      Specification of Letters Patent.    Patented Aug. 15, 1911.

Application filed April 3, 1911. Serial No. 618,625.

*To all whom it may concern:*

Be it known that I, GEORGE MARSHALL, a citizen of the United States, residing in Fremont, in the county of Dodge and State of Nebraska, have invented certain new and useful Improvements in Machines for Making Shocks, of which the following is a specification.

In my United States Patent No. 937,454 of October 19, 1909 I have shown a machine for making shocks in which a wagon is provided with upright posts or standards so spaced as to receive a number of sheaves and hold them while being bound. The wagon which travels abreast of the binder receives the sheaves as fast as formed on an elevator, which extends from the place where the bundle-carrier of the binder is usually attached to the side of the wagon and drops the sheaves therein. A rope attached to the bottom of the wagon extends through a hole therein around a pulley mounted on the underside of the wagon and then around a windlass or drum mounted on a shaft which carries a sprocket wheel geared to one of the wagon wheels. The sprocket wheel is able to revolve independently of the shaft which carries the drum, but the drum is rigidly attached to the shaft and said shaft carries a clutch member which revolves at all times with the shaft and which is adapted to engage a clutch member rigidly connected with the sprocket wheel. Mechanism is provided for throwing the clutch members into and out of engagement with each other, the operation being such that when these members are engaged and the wagon is traveling the drum is revolved and the compressing rope connected therewith is wound on the drum. A locking pawl or detent is provided which holds the rope taut and by releasing this pawl the rope may be slackened. This compressing rope is adapted to extend around the sheaves or bundles and when drawn tight compresses the sheaves into a compact shock.

Another rope is provided on the floor of the wagon near the posts and when the sheaves are compressed by the compressing rope, the binding rope is drawn tight and tied securely. The shock thus completed is turned into an upright position, cap sheaves are placed on it and the shock is moved onto trap doors in the bottom of the wagon at its rear end. These doors are normally held up by bolts, but when the bolts are released the trap doors drop and allow the shock to fall to the ground.

According to my present invention I provide a machine for making shocks of substantially the construction above described and shown in my patent of October 19, 1909 except that in place of the trap doors shown in said patent, I provide improved means for lowering the shocks to the ground. I now provide a skeleton frame which is suspended at the rear end of the wagon from an arched frame by means of block-and-tackle so that the shock-supporting frame can be lowered and raised when desired. The weight of the shock-supporting frame is counterbalanced by weights so that the frame will remain in any position to which it is raised or lowered and will not drop of its own weight, but when the shock-supporting frame is loaded with a shock the weight of the latter will cause the frame to descend when the rope is operated for this purpose.

In the accompanying drawings, Figure 1 shows a plan view of a machine for making shocks constructed in accordance with my invention. Fig. 2 shows a side elevation of the rear portion thereof partly in section. Fig. 3 is a rear elevation of the machine. Fig. 4 is a perspective view of the rear portion of the machine with parts broken away in order to better show other parts, and this figure of the drawing also shows how a shock is supported and lowered. Fig. 5 is a perspective view of the shock-supporting frame detached. Fig. 6 is a perspective view of the braces to which the chains for dragging the shock-supporting frame are attached.

The wagon A is of substantially the same construction as that shown in my before mentioned patent and the sheaves as they come from the binder or from the elevator are delivered on to the bottom of the wagon. The sheaves are placed between upright posts C, like those shown in my prior patent, and when a sufficient number of sheaves has been placed between the posts they are compressed by the rope D which is attached at one end ($c$) to the wagon body and extends through a hole $c'$ in the bottom of the wagon. The rope then passes around a pulley $d$ and is attached to a windlass or drum E on a shaft $E'$ carrying clutch mechanism $E^2$ operated by the lever mechanism $E^3$ and the handle $E^4$, all such mechanism being similar to that heretofore employed. The clutch member e which is loose on the shaft E' is connected by a sprocket gearing F to one of the hind wheels of the wagon. Detent mechanism G, similar to that heretofore employed, is operated by the handle G'. When the rope D is made to surround a shock of sheaves and the clutch members are connected, the wagon is driven forward and the rope compresses the shock which is then bound with a rope in the manner hereinbefore described. After this the compressing rope is withdrawn from the shock, the shock is turned to an upright position and the cap sheaves are applied in the manner hereinbefore described. This forms a shock ready to be deposited in the field. B indicates holders for the ropes for tying the shocks and cap sheaves.

The bottom of the wagon at the rear portion thereof is cut away between the sides H thereof to form an opening in which is arranged the shock-supporting frame L comprising two parallel side bars $l$, a front cross-bar $l'$ and a bottom cross-bar $l^2$ intermediate the front and rear ends of the side bars. On this cross-bar $l^2$ are supported parallel rods $l^3$ which are attached to the front cross-bar $l'$ and are also fastened at $l^4$ to the cross-bar $l^2$. The shock-supporting frame L is suspended from a U-shaped frame M attached to the sides of the wagon body by means of block-and-tackle N of any suitable construction. The rope $n$ may have its free end attached to a cleat $n'$ on one of the sides of the frame M and the block-and-tackle is connected with a bail O attached to the shock-supporting frame by means of chains $o$. By means of the rope $n$ the shock-supporting frame may be raised and lowered. In order to prevent the shock from falling backward from the shock-supporting frame out of the wagon, I provide a guard P attached to the sides of the wagon and extending across the rear portion thereof from one side of the wagon to the other.

In order to counterbalance the weight of the shock-supporting frame I provide weights S connected to cords or chains $s$ passing over pulleys S' on the wagon frame and attached to the side bars of the shock-supporting frame. Preferably two weights and cords or chains are applied to each side bar so that the front and rear portions of the frame are counterbalanced. When a shock is placed on the frame L in the manner shown in Fig. 4, the rope $n$ is detached from the cleat $n'$ and let out so that the shock-supporting frame will be lowered in the manner indicated by dotted lines in Fig. 4, and then the shock is deposited on the ground and the wagon is driven away from it so as to leave it standing. After the shock has been thus withdrawn the rope $n$ may be operated to lift the frame L to its elevated position ready to receive another shock.

X, X indicate chains attached to the front end of the shock-supporting frame and extending under the wagon and connected to braces thereon. These braces may be of any suitable construction. As shown they consist of V-shaped downwardly extending brackets $X'$, $X^2$ attached to the bottom of the wagon. When the shock-supporting frame L is lowered and the wagon is drawn forward, the chains X draw forward the frame L and leave the shock on the ground.

I claim as my invention:

1. A machine for forming shocks, comprising a wagon body carrying means for compressing sheaves and forming them into a shock, a vertically movable shock-supporting frame at the rear part of the wagon, an arched frame rising from the wagon body above the shock-supporting frame, block-and-tackle mechanism carried by the arched frame and connected with the shock-supporting frame for raising and lowering the latter, and means for counterbalancing the weight of the shock-supporting frame.

2. A machine for forming shocks, comprising a wagon body provided with means for compressing sheaves to form a shock, and a vertically movable shock-supporting frame at the rear end of the wagon body provided with counterbalancing weights, a bail, an arched frame rising from the wagon body above the shock-supporting frame, and block-and-tackle mechanism carried by said arched frame and connected with the bail of the shock-supporting frame for raising and lowering the latter.

In testimony whereof, I have hereunto subscribed my name.

GEORGE MARSHALL.

Witnesses:
S. S. SIDNER,
JESSIE MILLER.